(12) United States Patent
Xue

(10) Patent No.: US 7,923,734 B2
(45) Date of Patent: Apr. 12, 2011

(54) ARRAY SUBSTRATE OF LIQUID CRYSTAL DISPLAY DEVICE AND METHOD OF MANUFACTURING THE SAME

(75) Inventor: Jianshe Xue, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 136 days.

(21) Appl. No.: 12/419,444

(22) Filed: Apr. 7, 2009

(65) Prior Publication Data
US 2009/0256158 A1 Oct. 15, 2009

(30) Foreign Application Priority Data
Apr. 15, 2008 (CN) .......................... 2008 1 0104068

(51) Int. Cl.
*H01L 33/00* (2010.01)
(52) U.S. Cl. .................... 257/72; 257/E33.053; 438/34; 349/139; 349/142
(58) Field of Classification Search ............... 257/72, 257/E33.053, E21.414; 438/34; 349/141, 349/139, 142, 144–146
See application file for complete search history.

(56) References Cited

U.S. PATENT DOCUMENTS
2006/0176434 A1* 8/2006 Kim et al. .................... 349/145
* cited by examiner

*Primary Examiner* — Kiesha R Bryant
*Assistant Examiner* — Tucker Wright
(74) *Attorney, Agent, or Firm* — Ladas & Parry LLP

(57) ABSTRACT

An array substrate comprising a base substrate, a common electrode, a gate line, a data line, a thin film transistor, a passivation layer and a pixel electrode of "∧" shape. The thin film transistor comprises a gate electrode, an active layer, a source electrode and a drain electrode; the gate electrode is connected with the gate line; the source electrode is connected with the data line; and the drain electrode is connected with the pixel electrode. A passivation layer is formed on the source electrode, the drain electrode and the data line, and a via hole is formed in the passivation layer over the drain electrode. The pixel electrode of "∧" shape is formed on the passivation layer and connected with the drain electrode through the via hole in the passivation layer. The data line is provided below the position corresponding to the boundary between the "/" portion and the "\" portion of the pixel electrode of "∧" shape. The array substrate increases the transmittivity of pixel and improves the display quality.

15 Claims, 6 Drawing Sheets

ARRAY SUBSTRATE OF LIQUID CRYSTAL DISPLAY DEVICE AND METHOD OF MANUFACTURING THE SAME

BACKGROUND

The invention relates to an array substrate of a liquid crystal display device and a method of manufacturing the same.

With the development of technology, liquid crystal display (LCD) devices have been replacing the conventional CRT display devices and become the main type of the next generation display devices. Among various LCD devices, thin film transistor liquid crystal display (TFT-LCD) devises prevail in the market of flat panel display devices due to low power consumption, relatively low manufacturing cost, and low radiation.

A TFT LCD is generally formed by assembling an array substrate and a color filter substrate. The array substrate of the TFT LCD comprises a plurality of gate lines and a plurality of data lines which are perpendicular to the gate lines, and the gate lines and the data lines intersect with each other and define a plurality of pixel regions. Each pixel may comprise a TFT as a switch device, a pixel electrode, and a common electrode. The TFT comprises a gate electrode, a gate insulating layer, an active layer, a source electrode and a drain electrode. The source and drain electrodes can be covered by a passivation layer, a via hole in which is formed above the drain electrode and leads to the drain electrode. The pixel electrode, which is formed on the passivation layer, is connected with the drain electrode of the TFT through the via hole in the passivation layer. A storage capacitor can be formed between a part of the pixel electrode and the gate line.

At present, the display modes of the TFT LCD comprise a Twisted Nematic (TN) mode, an In-Plane-Switching (IPS) mode, a Fringe Field Switching (FFS) mode, and the like. In the FFS mode, the combination of a transparent planar electrode (common electrode) and a finger electrode can form a more appropriate electric field and optimize the arrangement of the liquid crystal molecules; meanwhile, the opaque metal electrode is replaced with a transparent electrode and the transmittivity of pixel can be remarkably improved.

However, in application of the FFS technology, since the pixel electrode on the array substrate is in an arrangement of electrodes of a shape of "/\" (finger electrodes), the electric field at the boundary between the "/" portion and the "\" portion of the electrode is irregular due to the interaction therebetween, which makes the liquid crystal molecules arranged irregularly and forms a display blind area, which degrades the transmittivity and the display quality of the array substrate. Furthermore, since the power consumption of a backlight source is gradually decreased for the purpose of environmental protection, the transmittivity of pixel has to be improved in order to obtain similar display quality as those before the power consumption of the backlight is decreased.

SUMMARY

According to an embodiment of the invention, an array substrate of a fringe field switching (FFS) mode liquid crystal display device is provided. The array substrate comprises a base substrate, and a common electrode, a gate line, a data line, a thin film transistor, a passivation layer and a pixel electrode of "/\" shape, which are all formed on the base substrate. The thin film transistor comprises a gate electrode, a source electrode and a drain electrode; the gate electrode is connected with the gate line; the source electrode is connected with the data line; the drain electrode is connected with the pixel electrode; a passivation layer is formed on the source electrode, the drain electrode and the data line, and a via hole is formed in the passivation layer over the drain electrode; the pixel electrode of "/\" shape is formed on the passivation layer and connected with the drain electrode through the via hole in the passivation layer; the data line is formed on the common electrode through an insulating layer and provided below the position corresponding to the boundary between the "/" portion and the "\" portion of the pixel electrode of "/\" shape.

According to another embodiment of the invention, a liquid crystal display device is provided. The liquid crystal display device comprises a color filter substrate and an array substrate configured as described above which confront each other, and a liquid crystal layer sandwiched between the substrates.

According to further another embodiment of the invention, a method of manufacturing an array substrate of a fringe field switching (FFS) liquid crystal display device is provided. The array substrate comprises a base substrate and a common electrode, a gate line, a data line, a thin film transistor, a passivation layer and a pixel electrode of "/\" shape, which are all formed on the base substrate. The thin film transistor comprises a gate electrode, a source electrode and a drain electrode; the gate electrode is connected with the gate line; the source electrode is connected with the data line; the drain electrode is connected with the pixel electrode; a passivation layer is formed on the source electrode, the drain electrode and the data line, and a via hole is formed in the passivation layer over the drain electrode; the pixel electrode of "/\" shape is formed on the passivation layer and connected with the drain electrode through the via hole in the passivation layer; the data line is formed on the common electrode through an insulating layer. The method comprises the step of forming the data line below the position corresponding to the boundary between the "/" portion and the "\" portion of the pixel electrode of "/\" shape.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The invention will become more fully understood from the detailed description given hereinafter and the accompanying drawings which are given by way of illustration only, and thus are not limitative of the invention and wherein.

DETAILED DESCRIPTION OF THE EMBODIMENTS

Figure 1A:
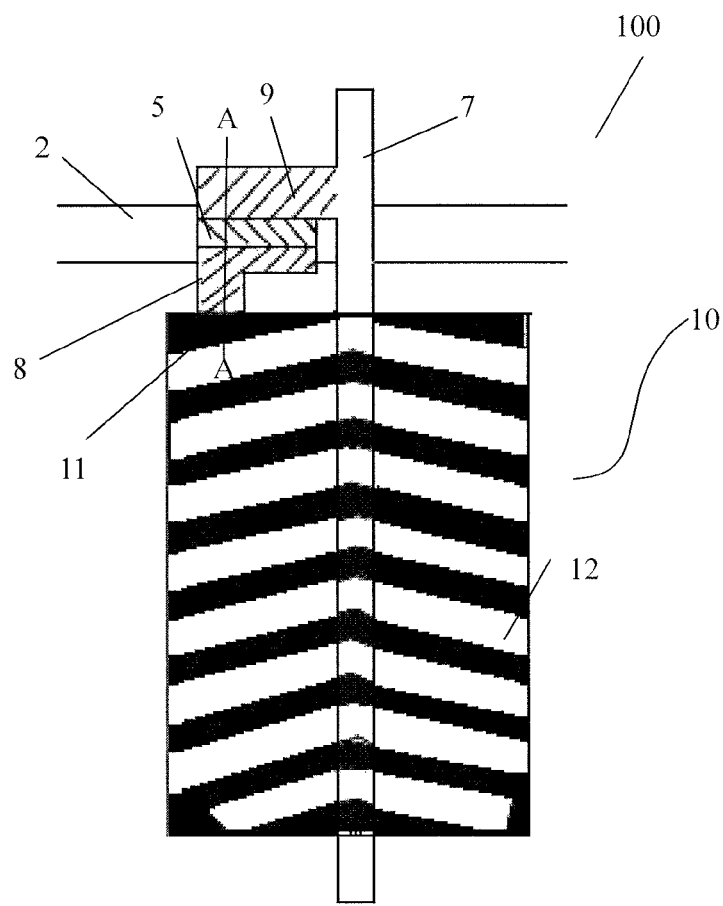
FIG. 1A is a top view showing a single pixel of an array substrate of a FFS mode display device according to the invention.

Embodiments of the invention provide an array substrate of a liquid crystal display (LCD) device and a method of manufacturing the same for improving the transmittivity of pixel, which is not high enough due to the display blind areas in pixel units of a conventional LCD device.

The array substrate and the method of manufacturing the same according to the embodiments of the invention will be described in detail hereinafter with reference to the accompanying drawings so that the features and advantages of the invention will become more apparent. Obviously, the following descriptions and the accompanying drawings are intended to illustrate but not to limit the invention. Other embodiments can be obtained according to the teachings of the following descriptions for those skilled in the art.

The array substrate of an embodiment of the invention comprises a base substrate and a common electrode, a gate line, a data line, a thin film transistor (TFT), a passivation layer, and a pixel electrode. The TFT comprises a gate electrode, an active layer, a source electrode and a drain electrode. The gate electrode is connected with the gate line; the source electrode is connected with the data line; the drain electrode is connected with the pixel electrode. The passivation layer is formed on the source and drain electrodes and the data line, and a via hole is formed in the passivation layer above the drain electrode; the pixel electrode of "/\" shape is formed on the passivation layer and connected with the drain electrode through the via hole in the passivation layer; the data line is formed on the common electrode through an insulating layer and below the position corresponding to the boundary between the "/" portion and the "\" portion of the pixel electrode of "/\" shape.

Next, the array substrate of the embodiment will be specifically described with reference to FIG. 1A and FIG. 1B. FIG. 1 is a top view showing a single pixel on the array substrate 100 of a FFS mode display device according to the embodiment of the invention, and FIG. 1B shows a cross-sectional view taken along line A-A. The array substrate 100 comprises:

a base substrate 10;

a common electrode 13 formed on the base substrate 10;

a gate electrode and gate line 2 formed on the base substrate 10 with the common electrode and provided in the same level as the common electrode;

a gate insulating layer formed on the gate electrode and gate line 2;

an active layer 5 formed on the gate insulating layer above the gate electrode;

a source electrode 8, a drain electrode 9, and a data line 7, wherein the source electrode 8 and the drain electrode 9 are formed on the active layer 5, the data line 7 is formed on the gate insulating layer;

a passivation layer formed on the source electrode 8, the drain electrode 9 and the data line 7, wherein a via hole 11 is formed in the passivation layer above the drain electrode 9; and a pixel electrode 12 of "/\" shape formed on the passivation layer and connected with the drain electrode 9 through the via hole in the passivation layer. The data line 7 is provided below the central position of the pixel electrode 12.

In order to make use of the display blind area in the pixel electrode of "/\" shape, the data line is provided below the position corresponding to the boundary between the "/" portion and the "\" portion of the pixel electrode.

Figure 1B:
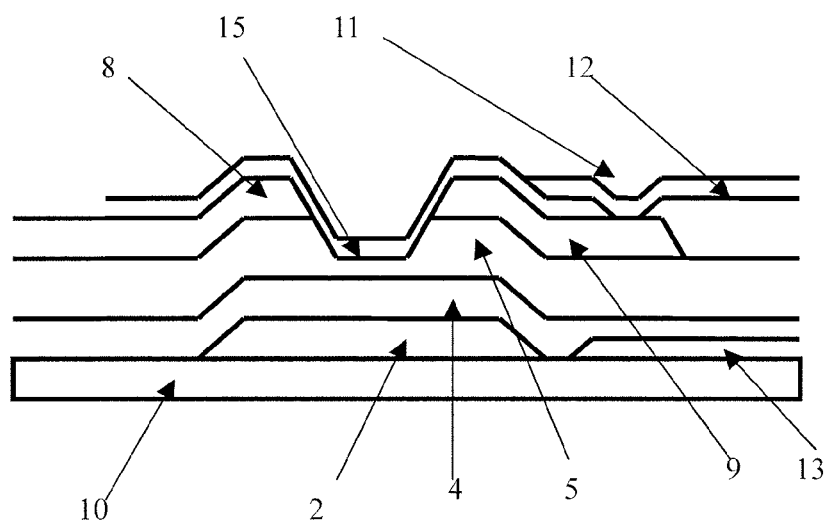
FIG. 1B is a cross-sectional view taken along line A-A.

Although only a single pixel is shown in FIG. 1A, it should be understood by those skilled in the art that a plurality of pixels the same as that described above can be formed on the array substrate in the form of array.

For example, the gate insulating layer and the passivation layer can be a single-layer film formed of SiNx, SiOx or SiOxNy or a composite film formed of any combination of the materials. The gate electrode and gate line 2 can be a single-layer film formed of AlNd, Al, Cu, Mo, MoW or Cr or a composite film formed of any combination of the materials, such as Mo/AlNd/Mo or AlNd/Mo. The source electrode and the drain electrode can be a single-layer film formed of Mo, MoW or Cr or a composite film formed of any combination of the material. The common electrode and the pixel electrode can be formed of indium tin oxide (ITO), indium zinc oxide (IZO) and the like.

According to the embodiment, since the data line is formed below the position corresponding to the display blind area in the pixel electrode, the position where is employed to form the data line in the conventional array substrate may be utilized by two adjacent pixels for displaying as a light transmitting portion. In other words, according to the array substrate of the TFT-LCD device of the present embodiment, the data line is formed at the position where the display blind area is formed and a light-transmitting portion is formed at the position where the data line in the conventional array substrate is formed. Therefore, the area of the pixel electrode can be suitably expanded so that the transmittivity of pixel can be improved, the display area can be increased, and the display quality of the liquid crystal display device can be improved accordingly.

Figure 2:
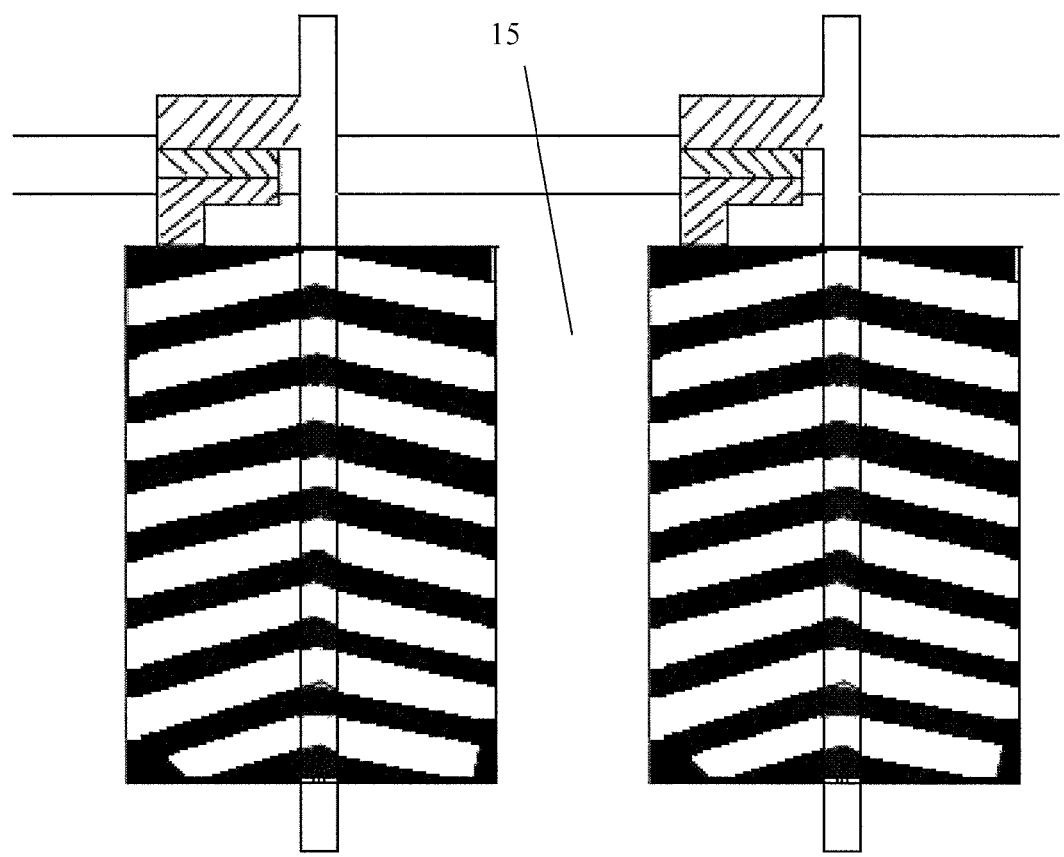
FIG. 2 is a top view showing two pixels of the array substrate of the FFS mode display device according to the invention.

FIG. 2 is a view showing two pixels of the array substrate of the TFT-LCD device according to the present embodiment. The light transmitting portion 15 between the two adjacent pixels on the array substrate is enlarged for the purpose of ease of observation. Owing to the existence of such light transmitting portion, the area of the pixel electrode can be suitably expanded, the transmittivity of pixel can be enhanced, the display area can be increased and the display quality of the liquid crystal display device can be improved accordingly.

Further, a method of manufacturing the array substrate of the thin film transistor liquid crystal display device is also provided in an embodiment of the invention. The method comprises the steps of forming a common electrode, a gate line, a data line, a gate insulating layer, a thin film transistor, a passivation layer and a pixel electrode on a base substrate. The thin film transistor comprises a gate electrode, an active layer, a source electrode and a drain electrode. The gate electrode is connected with the gate line; the source electrode is connected with the data line; the drain electrode is connected with the pixel electrode; the passivation layer is formed above the drain electrode, a via hole is formed in the passivation layer on the source and drain electrodes and the data line. The pixel electrode of "/\" shape is formed on the passivation layer and connected with the drain electrode through the via hole in the passivation layer; the data line is formed on the common electrode through an insulating layer. The method of the embodiment comprises a step of forming the data line below the position corresponding to the boundary between the "/" portion and the "\" portion of the pixel electrode of "/\" shape.

The method of manufacturing the array substrate of the thin film transistor liquid crystal display device will be described hereinafter with reference to the corresponding accompanying drawings.

Figure 3:
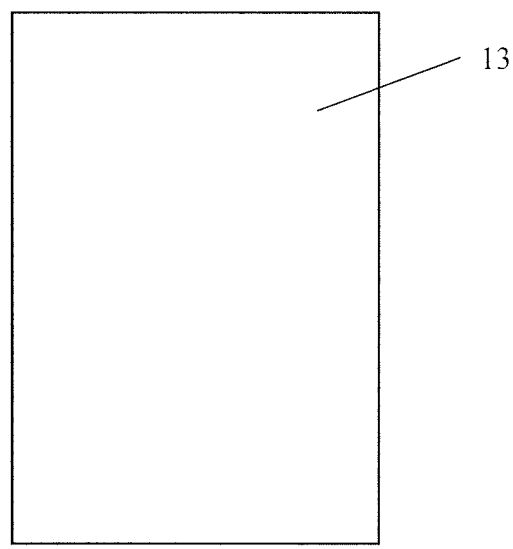
FIG. 3 is a diagram showing the first procedure of a method of manufacturing the array substrate of the FFS mode display device according to the invention.

Step 1. As shown in FIG. 3, a common electrode layer with the thickness of about 40 nm is deposited on a base substrate 10, e.g., by using a magnetron sputtering method or an electron beam evaporation, and then the common electrode is formed by patterning the common electrode layer. A typical patterning process comprises the processes of coating a photoresist, exposing and developing the photoresist to form a photoresist pattern, etching by using the photoresist pattern as a mask, removing or peeling off the photoresist pattern and the like.

Figure 4:
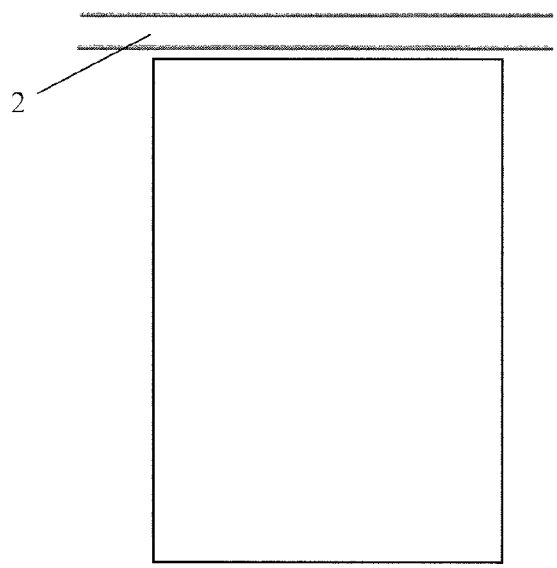
FIG. 4 is a diagram showing the second procedure of the method of manufacturing the array substrate of the FFS mode display device according to the invention.

Step 2. As shown in FIG. 4, a metal film with low resistivity is deposited after step 1, e.g., by using the magnetron sputtering method or the electron beam evaporation, and then the gate electrode and gate line 2 is formed on certain regions on the base substrate by patterning the metal film. In the present embodiment, since the gate line is also used as the gate electrode of the TFT, a part of the gate line shown in the figure is the gate electrode. However, the invention is not limited to case of the embodiment, and a gate electrode branching from the gate line can also be formed. For example, the metal film can be a single-layer film formed of AlNd, Al, Cu, Mo, MoW or Cr or a composite film formed of any combination of one of AlNd, Al and Cu and one of Mo, MoW and Cr, such as Mo/AlNd/Mo or AlNd/Mo.

Step 3. A film for the gate insulating layer with the thickness of about 1000 Å (1 Å=$10^{-1}$ m) to 6000 Å is deposited on the base substrate 10 after step 2, e.g., by using a chemical vapor deposition (CVD) method to form the gate insulating layer.

Figure 5:
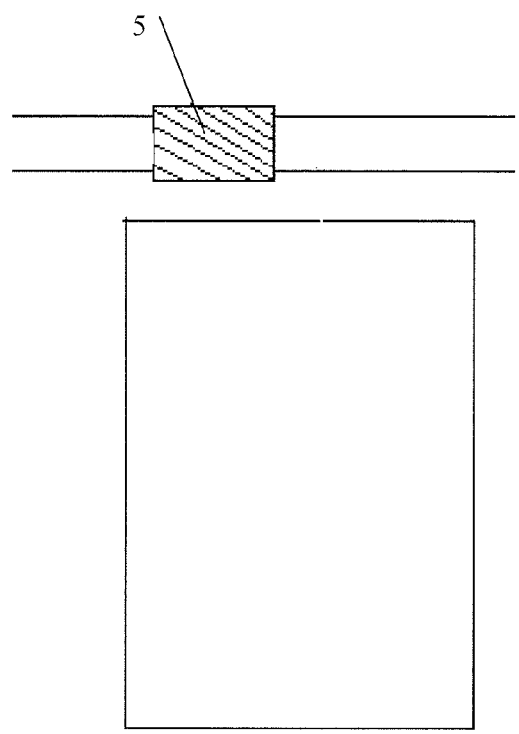
FIG. 5 is a diagram showing the fourth procedure of the method of manufacturing the array substrate of the FFS mode display device according to the invention.

Step 4. As shown in FIG. 5, a film for the active layer with the thickness of about 1000 Å to 6000 Å is deposited on the array substrate, e.g., by using the CVD method, and then the active layer 5 is formed on the gate insulating layer directly over the gate line by patterning.

Figure 6:
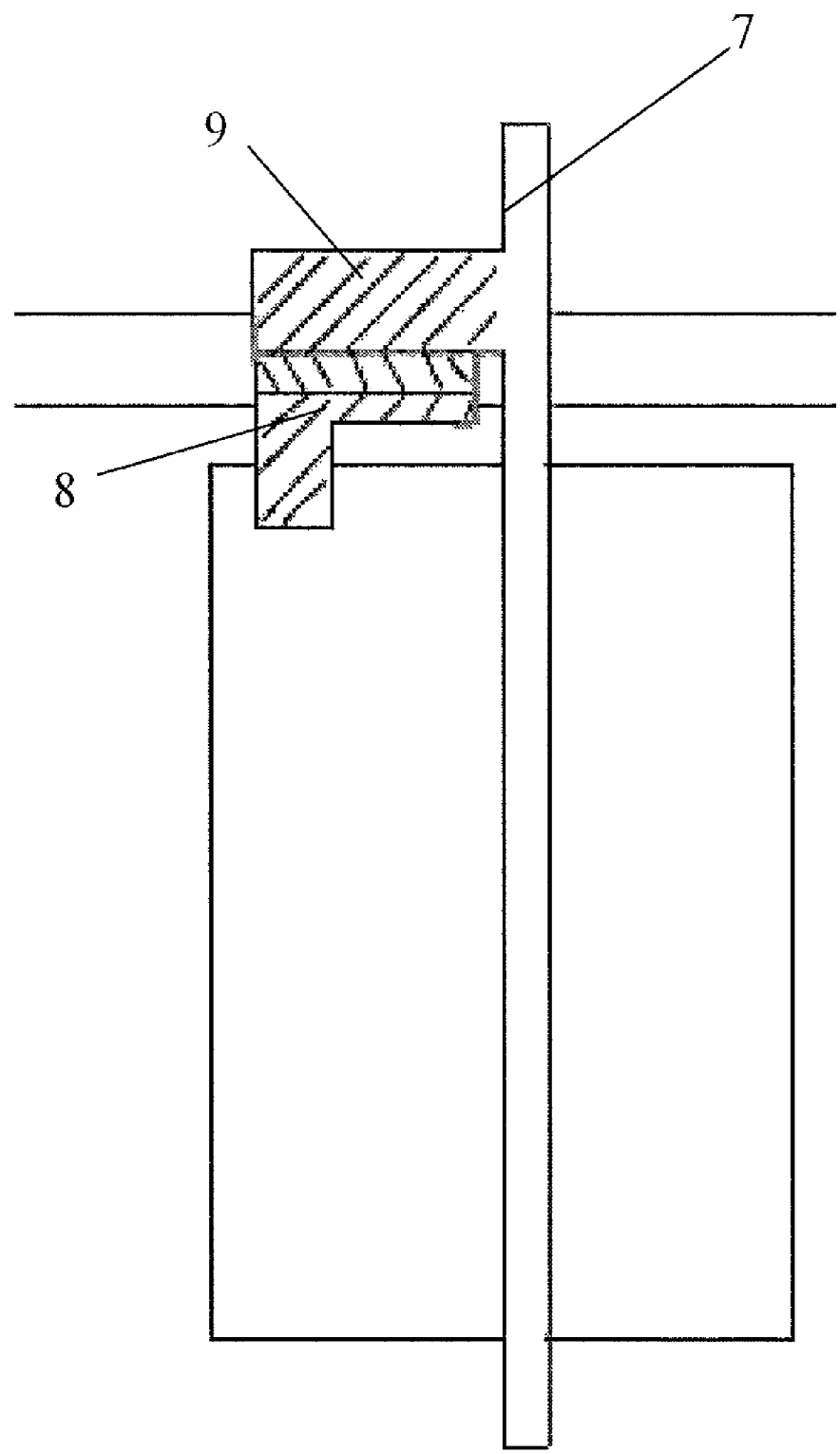
FIG. 6 is a diagram showing the fifth procedure of the method of manufacturing the array substrate of the FFS mode display device according to the invention.

Step 5. As shown in FIG. 6, a source-drain metal film is deposited on the base substrate 10 with the active layer, and then a source electrode 8, a drain electrode 9 and a data line 7 are formed by patterning. The source and drain electrodes are formed on the active layer 5 while the data line is on the gate insulating layer.

Figure 7:
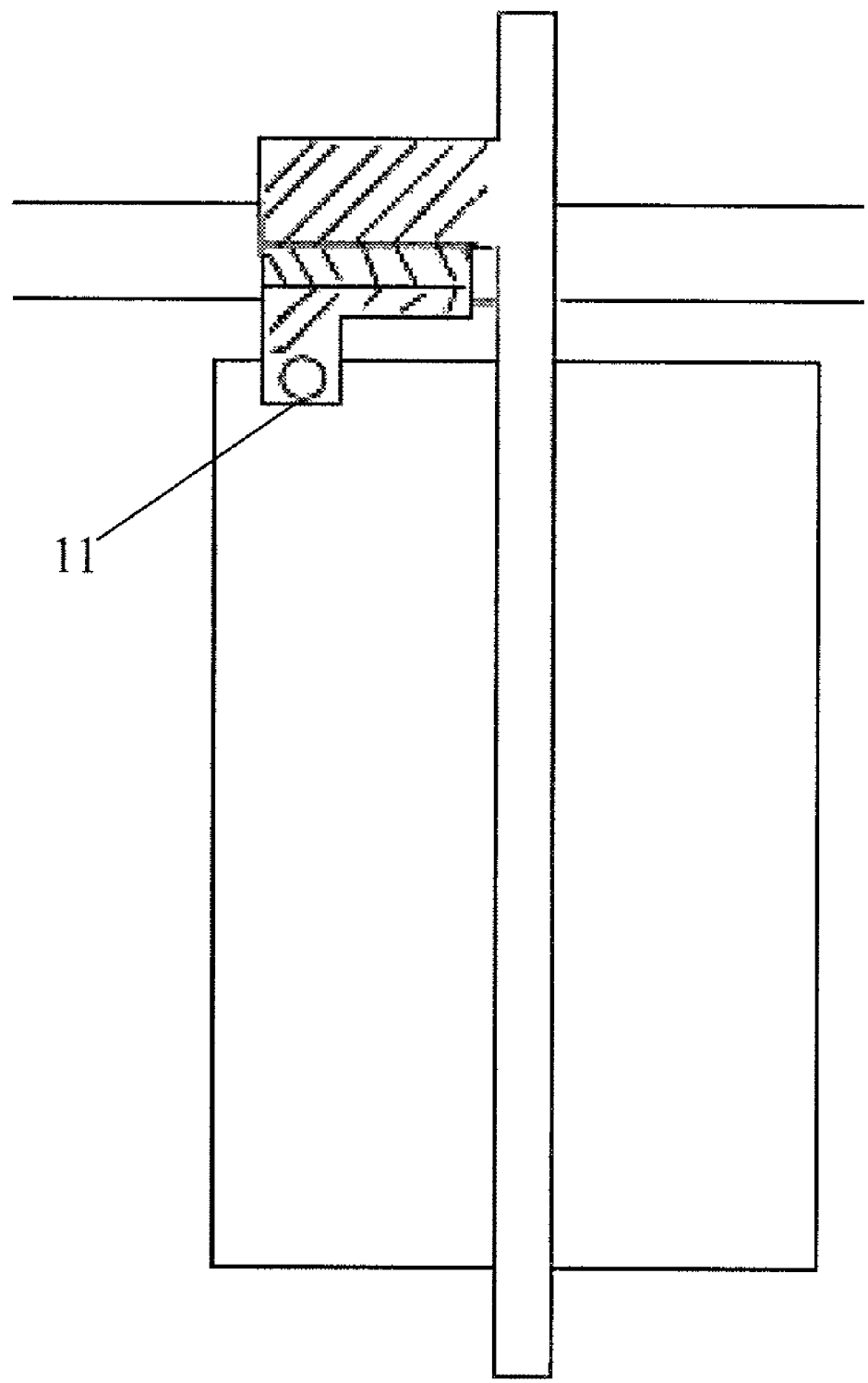
FIG. 7 is a diagram showing the sixth procedure of the method of manufacturing the array substrate of the FFS mode display device according to the invention.

Step 6. As shown in FIG. 7, a film for the passivation layer with the thickness of about 1000 Å to 6000 Å is deposited on the base substrate 10 to form the passivation layer after the Step 5, and then a via hole 11 is formed in the passivation layer on the drain electrode by patterning. For example, the passivation layer can be a single-layer film formed of SiNx. SiOx or SiOxNy or a composite layer formed of any combination of SiNx, SiOx and SiOxNy.

Figure 8:
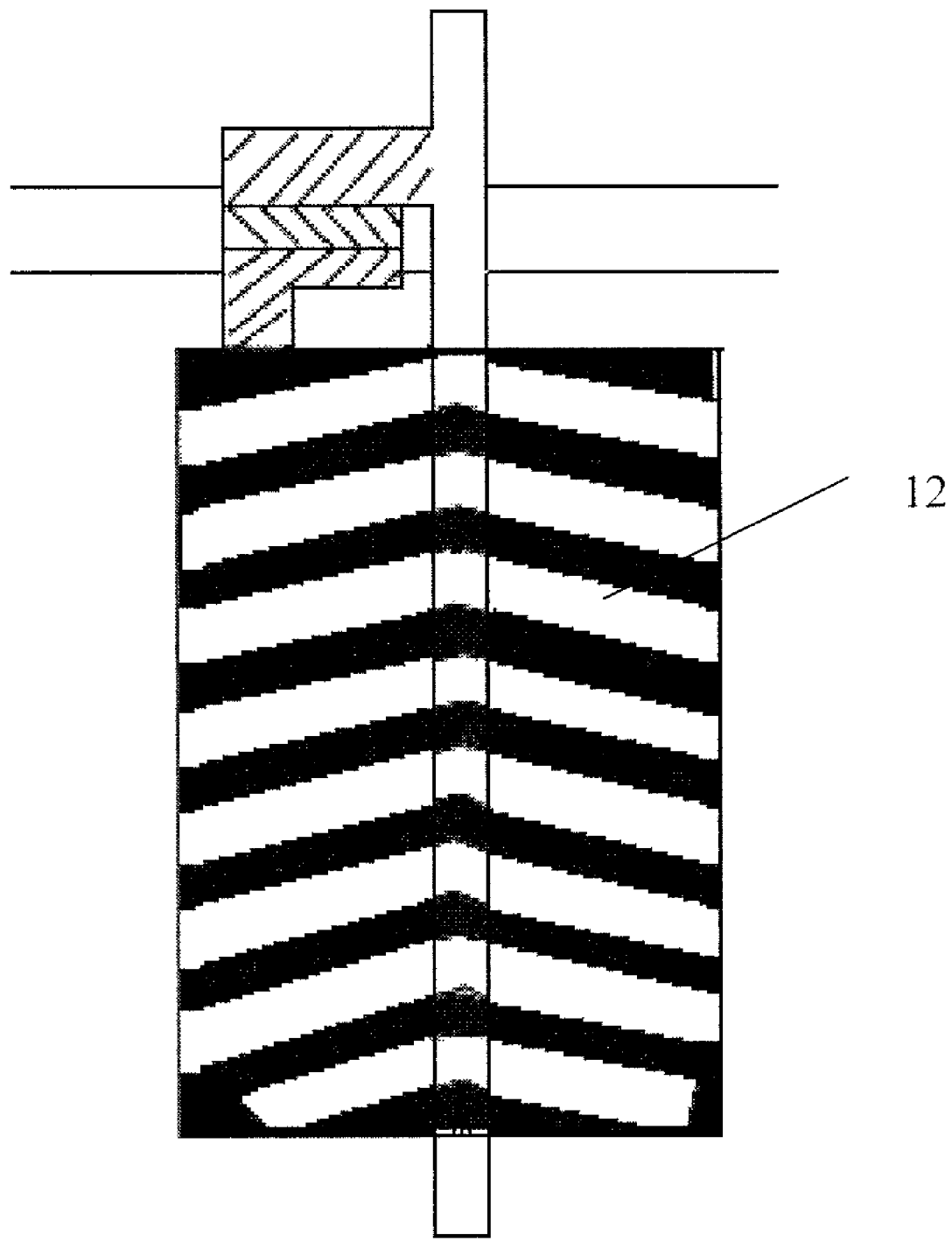
FIG. 8 is a diagram showing the seventh procedure of the method of manufacturing the array substrate of the FFS mode display device according to the invention.

Step 7. As shown in FIG. 8, a film for a pixel electrode with the thickness of about 100 Å to 100 Å is deposited on the passivation layer, e.g., by using the magnetron sputtering method after the Step 6, and then a "/\" shape pixel electrode connected with the drain electrode through the via hole in the passivation layer is formed by patterning. The data line is provided below the position corresponding to the boundary between the "/" portion and the "\" portion of the /\shape pixel electrode. However, the present embodiment of the invention is not limited to the embodiment, and the data line can be provided at other positions corresponding to the display blind area. For example, the common electrode and the pixel electrode can be formed of indium zinc oxide (ITO), indium zinc oxide (IZO) and the like.

In the array substrate of the TFT-LCD manufactured as described above, since the date line is provided below a position within the pixel electrode and the position corresponding to the display blind area is utilized, an available region appears at the position where the data line and the source and drain electrodes are formed in conventional array substrate. Therefore, the area of the pixel electrode can be suitably enlarged and the display quality of the TFT-LCD device can be improved.

In the above-mentioned embodiment, the thin film transistor has a structure of bottom gate type; however, a structure of top gate type TFT can also be adopted as necessary.

The embodiment of the invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. An array substrate of a fringe field switching (FFS) mode liquid crystal display device, comprising:
   a base substrate; and
   a common electrode, a gate line, a data line, a thin film transistor (TFT), a passivation layer, and a pixel electrode of "/\" shape, which are all formed on the base substrate,
   wherein the TFT comprises a gate electrode, a source electrode, and a drain electrode, the gate electrode is connected with the gate line, the source electrode is connected with the data line, and the drain electrode is connected with the pixel electrode;
   a passivation layer is formed on the source electrode, the drain electrode and the data line, and a via hole is formed in the passivation layer over the drain electrode;
   the pixel electrode of "/\" shape is formed on the passivation layer and connected with the drain electrode through the via hole in the passivation layer; and
   the data line is formed on the common electrode through an insulating layer and provided below the position corresponding to the boundary between the "/" portion and the "\" portion of the pixel electrode of "/\" shape.

2. The array substrate of the FFS mode liquid crystal display device according to claim 1, wherein the insulating layer is a gate insulating layer.

3. The array substrate of the FFS mode liquid crystal display device according to claim 2, wherein the gate insulating layer and the passivation layer are a single-layer film formed of a material selected from the group consisting of SiNx, SiOx and SiOxNy.

4. The array substrate of the FFS mode liquid crystal display device according to claim 2, wherein the gate insulating layer and the passivation layer are a composite film formed of any combination of SiNx, SiOx and SiOxNy.

5. The array substrate of the FFS mode liquid crystal display device according to claim 1, wherein the gate line, the gate electrode, the data line, the source electrode and the drain electrode are a single-layer film formed of a material selected from the group consisting of AlNd, Al, Cu, Mo, MoW, and Cr.

6. The array substrate of the FFS mode liquid crystal display device according to claim 1, wherein the gate line, the gate electrode, the data line, the source electrode and the drain electrode are a composite film formed of a material selected from AlNd, Al and Cu and a material selected from Mo, MoW and Cr.

7. The array substrate of the FFS mode liquid crystal display device according to claim 1, wherein the common electrode and the pixel electrode are formed of a material selected from the group consisting of indium tin oxide and indium zinc oxide.

8. A method of manufacturing an array substrate of a fringe field switching (FFS) mode liquid crystal display device, wherein the array substrate comprises a base substrate and a common electrode, a gate line, a data line, a thin film transistor, a passivation layer and a pixel electrode of "Λ" shape, which are all formed on the base substrate; the thin film transistor comprises a gate electrode, a source electrode and a drain electrode; the gate electrode is connected with the gate line; the source electrode is connected with the data line, the drain electrode is connected with the pixel electrode; a passivation layer is formed on the source electrode, the drain electrode and the data line, and a via hole is formed in the passivation layer over the drain electrode; the pixel electrode of "Λ" shape is formed on the passivation layer and connected with the drain electrode through the via hole in the passivation layer; the data line is formed on the common electrode through an insulating layer; the method comprising the step of:
forming the data line below the position corresponding to the boundary between the "/" portion and the "\" portion of the pixel electrode of "Λ" shape.

9. The method according to claim 8, further comprising the steps of:
depositing a common electrode layer on the base substrate to form the common electrode by patterning;
depositing a metal film on the base substrate with the common electrode to form the gate electrode and gate line by patterning;
depositing a film for the gate insulating layer on the base substrate having the gate line;
depositing a film for the active layer on the gate insulating layer on the gate line to form the active layer by patterning;
depositing a source-drain metal film on the base substrate having the active layer to form the source electrode, the drain electrode and the data line by patterning;
depositing a film for the passivation layer on the source electrode, the drain electrode and the data line and forming a via hole in the passivation layer on the drain electrode by patterning; and
depositing a layer for the pixel electrode on the passivation layer to form the pixel electrode of "Λ" shape by patterning,
wherein the pixel electrode of "Λ" shape is connected with the drain electrode through the via hole in the passivation layer.

10. The method according to claim 9, wherein the gate insulating layer and the passivation layer are a single-layer film formed of a material selected from the group consisting of SiNx, SiOx and SiOxNy.

11. The method according to claim 9, wherein the gate insulating layer and the passivation layer are a composite film formed of any combination of SiNx, SiOx and SiOxNy.

12. The method according to claim 8, wherein the gate line, the gate electrode, the data line, the source electrode and the drain electrode are a single-layer film formed of a material selected from the group consisting of AlNd, Al, Cu, Mo, MoW and Cr.

13. The method according to claim 8, wherein the gate line, the gate electrode, the data line, the source electrode and the drain electrode are a composite film formed of a material selected from AlNd, Al and Cu and a material selected from Mo, MoW and Cr.

14. The method according to claim 8, wherein the common electrode and the pixel electrode are formed of a material selected from the group consisting of indium tin oxide and indium zinc oxide.

15. A fringe field switching (FFS) liquid crystal display device, comprising:
a color filter substrate and an array substrate confronting each other and a liquid crystal layer sandwiched between the color filter substrate and the array substrate, wherein the array substrate comprises:
a base substrate; and
a common electrode, a gate line, a data line, a thin film transistor (TFT), a passivation layer, and a pixel electrode of "Λ" shape, which are all formed on the base substrate,
wherein the TFT comprises a gate electrode, a source electrode and a drain electrode, the gate electrode is connected with the gate line, the source electrode is connected with the data line, and the drain electrode is connected with the pixel electrode;
a passivation layer is formed on the source electrode, the drain electrode and the data line, and a via hole is formed in the passivation layer over the drain electrode;
the pixel electrode of "Λ" shape is formed on the passivation layer and connected with the drain electrode through the via hole in the passivation layer; and
the data line is formed on the common electrode through an insulating layer and provided below the position corresponding to the boundary between the "/" portion and the "\" portion of the pixel electrode of "Λ" shape.

* * * * *